United States Patent [19]
Hofmann et al.

[11] Patent Number: 5,596,798
[45] Date of Patent: Jan. 28, 1997

[54] APPARATUS FOR ASSEMBLING A BEARING UNIT, IN PARTICULAR A WHEEL BEARING UNIT FOR MOTOR VEHICLES

[75] Inventors: Heinrich Hofmann; Günther Glas, both of Schweinfurt; Roland Langer, Schwanfeld; Vasilis Massiotis, Niederwerrn, all of Germany

[73] Assignee: FAG Kugelfischer Georg Schafer AG, Germany

[21] Appl. No.: 324,912

[22] Filed: Oct. 18, 1994

[30] Foreign Application Priority Data

Oct. 20, 1993 [DE] Germany ............... 42 35 793.8

[51] Int. Cl.⁶ ............................................. B23P 15/00
[52] U.S. Cl. ................................... 29/724; 29/898.07
[58] Field of Search ............... 29/898.07, 898.062, 29/898.064, 724; 384/448

[56] References Cited

U.S. PATENT DOCUMENTS 5,061,090 10/1991 Kriaski et al. .................... 384/537
5,159,754 11/1992 Vancsik ........................... 29/898.07
5,165,169 11/1992 Boyce ............................. 29/898.07
5,240,333 8/1993 Hassiotis et al. .

FOREIGN PATENT DOCUMENTS 1915932 10/1969 Germany .

Primary Examiner—Irene Cuda
Attorney, Agent, or Firm—Ostrolenk, Faber, Gerb & Soffen, LLP

[57] ABSTRACT

An apparatus for assembling a bearing unit, particularly a wheel bearing unit for motor vehicles, in such a manner that the wheel bearing unit is of light construction, shows no prior damage and permits great flexibility in the manufacturing process. The force which is applied for the plastic deformation of the bead (9) at the end of the hub (1) is divided between the hub (1) and its support ram (11), on the one hand, and the hub flange (2) and its receiver (10) on the other hand, and thus, the necessary plastic deformation is concentrated in the region of the bead and not in the region between the hub (1) and the hub flange (2).

8 Claims, 1 Drawing Sheet

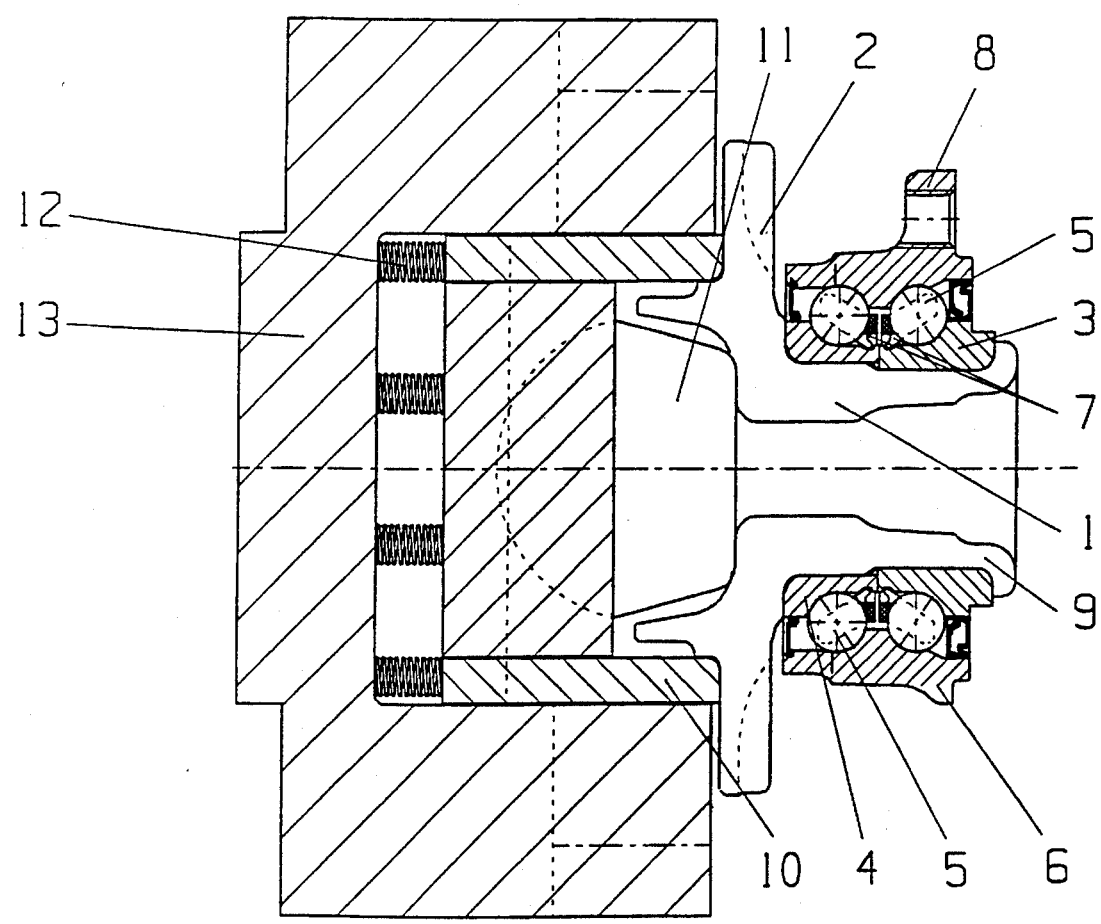

APPARATUS FOR ASSEMBLING A BEARING UNIT, IN PARTICULAR A WHEEL BEARING UNIT FOR MOTOR VEHICLES

BACKGROUND OF THE INVENTION

1. Field of the Invention

The present invention relates to a process and apparatus for assembling a bearing unit, and more particularly a wheel bearing unit for motor vehicles, having a hub and an angular antifriction bearing, at least one inner ring of the antifriction bearing being fixed axially by a bead formed on the end of the hub by means of plastic deformation.

2. Background Art

The Applicant's Federal Republic of Germany 41 34 434 A1, which corresponds to U.S. Pat. No. 5,240,333, discloses a wheel bearing unit in which a bead is developed on the end of the hub, the bead having interruptions which are uniformly distributed on its circumference for measurement of the speed of rotation. Although this wheel bearing unit has proven suitable in practice, there is a need to develop it further so that, while retaining its advantages, greater load-bearing capacity and easier mounting are obtained.

From Federal Republic of Germany 19 15 932 A1, which corresponds to U.S. Pat. No. 3,583,511 a bearing device is furthermore known in which the flange and the inner shell are undetachably connected to each other by flanging. Due to the dimensions of the flange, however, such a unit cannot bear large forces and is difficult to manufacture and mount. Furthermore, in certain cases, as a result of variations in tolerances, the hub or antifriction bearings may be already damaged upon assembly due to the high forces of deformation applied to the hub, and must then be sorted out at substantial expense.

SUMMARY OF THE INVENTION

It is therefore an object of the present invention to provide a process and apparatus for assembling a wheel bearing unit of the aforementioned type, which can produce a wheel bearing unit of light construction, with reduced risk of manufacturing defects, and permitting great flexibility in manufacture.

This object may be achieved by a process and an apparatus as disclosed herein.

As a result of this process, the force applied for the plastic deformation of the end of the hub is taken up, for example, in a proportion of 80% to 20% by the hub and the hub flange respectively. Because of this substantial support, the hub furthermore is not overstressed in the region of its flange. Finally, the apparatus is of simple construction and thus particularly well-suited for heavy everyday production use.

Other features and advantages of the present invention will become apparent from the following description of the invention which refers to the accompanying drawing.

BRIEF DESCRIPTION OF THE DRAWINGS

FIG. 1 shows a wheel bearing unit accommodated in a receiver in accordance with an embodiment of the invention.

DETAILED DESCRIPTION OF AN EMBODIMENT OF THE INVENTION

FIG. 1 shows a wheel bearing unit comprising a hub 1 which is developed as a hollow hub and has a flange 2 for attachment to a motor vehicle or a wheel rim (not shown). On the hub 1 there may be arranged, for instance, two ball bearing inner rings 3, 4 which, via balls 5, form an antifriction bearing of O-arrangement having a single-part outer ring 6 and separators 7. The outer ring 6 also has an integrated fastening flange 8. The hub 1 is provided at its end with a bead 9 for the form-locked assembly and the axial prestressing of the antifriction bearing.

For assembly, the wheel bearing unit is inserted in a receiver 10 which supports the hub flange 2. Within the hollow hub, the hub is supported by a ram 11. The receiver 10 and the ram 11 are supported resiliently, for instance by respective sets of springs 12, against a baseplate 13 for dividing the force which is applied for carrying out the plastic deformation of the bead 9. Thus, only a part of the deforming force, in this example 20%, is conducted over the ball-bearing inner rings and the hub flange. In this way, it is assured that the antifriction bearing is not damaged during assembly, and further that the region of the flange 2 of the hub 1 is not excessively stressed.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. An apparatus for applying a plastic deformation force during assembly of a bearing unit, to produce an annular bead at one end of a hub whereon there is an outer hub flange at the opposite end of the hub;

said bearing unit including said hub, antifriction bearing elements, at least one inner ring constituting an inner raceway for said antifriction bearing elements, and said inner raceway being fixed axially on the hub by said bead;

the apparatus comprising a flange receiver sized and shaped for engaging the hub flange and a ram for engaging a central portion of the hub radially inward of the hub flange, the flange receiver and the ram having respective resilient supports for dividing the plastic deformation force so that only a part of the force of deformation is conducted by the hub flange, and the rest of the force is conducted by the hub to the ram.

2. An apparatus according to claim 1, herein the ram is resiliently supported on a baseplate.

3. An apparatus according to claim 1, wherein both the ram and the flange receiver are resiliently supported on a baseplate.

4. An apparatus according to claim 1, wherein the ram has a convex portion for engaging the hub.

5. An apparatus according to claim 1, wherein the respective resilient supports have predetermined resilient strength such that the ram receives more force from the hub than the receiver receives from the hub flange.

6. An apparatus according to claim 1, wherein the respective resilient supports comprise respective sets of springs.

7. An apparatus according to claim 6, wherein said respective sets of springs are supported on a common base.

8. An apparatus according to claim 5, wherein the ram receives about 80 percent of the force and the receiver receives about 20 percent of the force.

* * * * *